(12) United States Patent
Mankovski et al.

(10) Patent No.: US 8,941,658 B2
(45) Date of Patent: Jan. 27, 2015

(54) METHOD AND APPARATUS FOR LAYERED OVERVIEW IN VISUALIZATION OF LARGE ENTERPRISE IT ENVIRONMENT

(75) Inventors: Serguei Mankovski, Toronto (CA); Maria Velez-Rojas, Dublin, CA (US); Michael C. Roberts, McKinney, TX (US); Esin Kiris, Holmdel, NJ (US)

(73) Assignee: CA, Inc., New York, NY (US)

( * ) Notice: Subject to any disclaimer, the term of this patent is extended or adjusted under 35 U.S.C. 154(b) by 288 days.

(21) Appl. No.: 13/160,943

(22) Filed: Jun. 15, 2011

(65) Prior Publication Data

US 2012/0320074 A1 Dec. 20, 2012

(51) Int. Cl.
*G06T 11/20* (2006.01)
*G09G 5/00* (2006.01)
*H04L 12/24* (2006.01)

(52) U.S. Cl.
CPC . *G09G 5/00* (2013.01); *H04L 41/22* (2013.01)
USPC ......................................................... 345/440

(58) Field of Classification Search
CPC ............................ G06T 11/206; G06F 3/0481
USPC ......................................................... 345/440
See application file for complete search history.

(56) References Cited

U.S. PATENT DOCUMENTS

| | | | |
|---|---|---|---|
| 5,748,617 A | 5/1998 | McLain, Jr. | |
| 5,819,251 A | 10/1998 | Kremer et al. | |
| 7,024,419 B1 | 4/2006 | Klenk et al. | |
| 7,305,623 B2 * | 12/2007 | Despotidis et al. | 715/736 |
| 7,739,605 B2 * | 6/2010 | Plotkin et al. | 715/736 |
| 8,069,188 B2 | 11/2011 | Larson et al. | |
| 2002/0135610 A1 * | 9/2002 | Ootani et al. | 345/734 |
| 2009/0116404 A1 | 5/2009 | Mahop et al. | |
| 2010/0325624 A1 | 12/2010 | Bartolo et al. | |
| 2012/0005242 A1 * | 1/2012 | Feng et al. | 707/805 |
| 2012/0141972 A1 * | 6/2012 | Dwyer et al. | 434/430 |

OTHER PUBLICATIONS

P Simonetto, D. Auber, "An Heuristic for the Construction of Intersection Graphs", 2009 13th Internation Conference Information Visualization, Jul. 2009, p. 673-678).*

(Continued)

*Primary Examiner* — Javid A Amini
*Assistant Examiner* — Jin Ge
(74) *Attorney, Agent, or Firm* — Myers Bigel Sibley & Sajovec, P.A.

(57) ABSTRACT

A method for layered overview visualization of an IT environment having nodes and links related to the nodes, comprising initializing the layered overview visualization by establishing a number of hierarchical levels, combining the nodes and the links related to the nodes into a plurality of elements based on one of function and type, for each hierarchical level, assigning one or more of the plurality of elements to the level in accordance with one of the function and the type and determining overlap of the assigned elements. The method further comprises navigating the layered overview visualization by selecting a view, selecting a level of the hierarchical levels within the selected view, choosing the overlap of one or more of the assigned elements in the selected level and highlighting the chosen elements, and displaying on a screen the selected level and the highlighted chosen elements in the selected level.

15 Claims, 15 Drawing Sheets

(56) References Cited

OTHER PUBLICATIONS

Ji Soo Yi, Youn ah Kang, John T. Stasko, and Julie A. Jacko, "Toward a Deeper Understanding of the Role of Interaction in Information Visualization", Visualization and Computer Graphics, IEEE Transactions on (vol. 13, Issue: 6), Nov.-Dec. 2007, p. 1224-1231.*

Iven Herman, Guy Melancon, and M. Scott Marshall, "Graph visualization and navigation in information visualization: A survey", Visualization and Computer Graphics, IEEE Transactions on (vol. 6, Issue: 1), Aug. 6, 2002, p. 24-43.*

Jie Liang and Mao Lin Huang, "Highlighting in information Visualization: a survey", Information Visualisation (IV), 2010 14th International Conference, Jul. 2010, p. 79-85.*

Paolo Simonetto, David Auber, Daniel Archambault, Fully Automatic Visualisation of Overlapping Sets, Computer Graphics Forum vol. 28, Issue 3, pp. 967-974, Jun. 2009.*

Shiozawa H, Okada K, Matushita Y (1999) Perspective layered visualization of collaborative workspaces. In: Proceedings of the international ACM SIGGROUP conference on supporting group work GROUP'99. Phoenix, AZ, pp. 71-80.*

\* cited by examiner

METHOD AND APPARATUS FOR LAYERED OVERVIEW IN VISUALIZATION OF LARGE ENTERPRISE IT ENVIRONMENT

FIELD

The present disclosure relates generally to navigating a visualization of a complex system, and more particularly to navigation of IT visualization.

BACKGROUND

Visualization of Information Technology (IT) infrastructures with hundreds or thousands of elements requires presentation of a very large number of objects in a limited real estate of graphic interfaces. Currently node-link diagrams are used to represent IT components. In node-link diagrams, elements of the IT infrastructure are represented as nodes with links among them that represent physical connections, dependency, composition and other types of relations. Each object (i.e., nodes and links) presented by the visualization often has large number of other objects and/or attributes related to it. Some attributes, such as name or class of the object, are used for identification. These attributes have to be presented to the user for information purposes or in form of a menu of action applicable to the object.

Existing visualization tools use overview mechanisms that simply present a zoomed-out view of the IT infrastructure. In a typical overview, users can see all of the elements at a glance and navigate among them to some extent, but they lose the ability to visually identify these elements. Moreover, most visualization mechanisms present relationships between objects in the form of lines or curves linking the objects. These relationships also have attributes. As the number of visualized elements grows, the overview loses more and more identification information. At some point the overview becomes just an undifferentiated mishmash of dots and lines and its value as a tool for navigation significantly decreases.

BRIEF SUMMARY

An inventive mechanism for navigation of IT visualization providing a semantically rich overview of the IT infrastructure is presented. In the novel system and method, the entire IT infrastructure is divided into a stack of layers. Each individual layer contains a sub-set of the elements in the IT infrastructure. The layers are arranged in a hierarchical sequence according to their function and nature.

A method for layered overview visualization of an IT environment having nodes and links related to the nodes is presented. The novel method comprises initializing the layered overview visualization by establishing a number of hierarchical levels, combining the nodes and the links related to the nodes into a plurality of elements based on one of function and type, for each hierarchical level, assigning one or more of the plurality of elements to the level in accordance with one of the function and the type and determining overlap of the assigned elements. The method further comprises navigating the layered overview visualization by selecting a view, selecting a level of the hierarchical levels within the selected view, choosing the overlap of one or more of the assigned elements in the selected level and highlighting the chosen elements, and displaying on a screen the selected level and the highlighted chosen elements in the selected level.

In one aspect, the method further comprises displaying one or more of the non-selected levels and elements related to the chosen highlighted elements in the one or more non-selected levels. In one aspect, some of the nodes are not combined with any other nodes and are assigned a lowest level of the hierarchical levels. In one aspect, the overlap is chosen using a function determined based on user input. In one aspect, determining the overlap is performed using a general algorithm.

A system for layered overview visualization of an IT environment having nodes and links related to the nodes is presented. The novel system comprises a first module operable to initialize the layered overview visualization, comprising establishing a number of hierarchical levels and based on one of function and type, combining the nodes and the links related to the nodes into a plurality of elements, the first module further operable to, for each hierarchical level, assign one or more of the plurality of elements to the level in accordance with one of the function and the type, and determine overlap of the assigned elements; and a second module operable to navigate the layered overview visualization, comprising selecting a view, selecting a level of the hierarchical levels within the selected view, choosing the overlap of one or more of the assigned elements in the selected level and highlighting the chosen elements, and displaying on a screen the selected level and the highlighted chosen elements in the selected level.

In one aspect, one of the first and second modules is further operable to display one or more of the non-selected levels and elements related to the chosen highlighted elements in the one or more non-selected levels. In one aspect, some of the nodes are not combined with any other nodes and are assigned a lowest level of the hierarchical levels. In one aspect, the overlap is chosen using a function determined based on user input. In one aspect, determining the overlap is performed using a general algorithm. In one aspect, the first and second modules are one module.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

An inventive system and method for navigation of IT visualization, offering the user a number of tools for navigation that provide a semantically rich overview, is presented. In this novel technique, the entire IT infrastructure is divided into a stack of layers. The layers are arranged in a hierarchical sequence according to their function and nature. The visualization enables viewing not only of IT elements but also of connections between and among elements. Two types of views for navigation are available.

Layer view is an overview showing all IT components of a corresponding layer. The components can be individual elements or assets, or groupings of elements or regions or any combination of this. This view provides at-a-glance view of the layer. Moving down from one layer to another layer strips away the top layer and opens up a layer below.

Band view is an at-a-glance overview of the entire layer stack. These views are displayed to users on a screen, such as computer screen, a computer monitor, or any display mechanism known to one skilled in the art.

The lowest layer contains assets or "pure elements" that have no sub-components. Exemplary assets can include specific software such as databases, and/or specific hardware such as CPUs, monitors, network routers, etc. Each individual layer above the lowest layer contains assets, regions and/or combinations of elements in the IT infrastructure, the elements being grouped by type or function. Regions or combinations of elements in one layer may be subdivided in lower layers.

Any object within the IT environment can be represented as an element. Exemplary elements can include databases, applications, laptops, CPUs, monitors, locations, subnetworks, hardware, software, etc. Elements can connect to and/or contain other elements. For example, a server can contain applications. Elements in one layer can be regions in another layer. For example, an APP element in the service layer can be a region in the application layer. Moreover, a database could be an element in the system layer, and a laptop could be an element in the service layer.

In one embodiment, the set of layers is: Service, Application, System, Network, Asset, Entitlement, Access, and Identity. In this embodiment, Asset and Identity have special roles. Asset layer represents an entire collection of IT assets of the enterprise. Identity layer represents the identity of users of IT assets. However, the invention is not limited to this set of layers or to these specific types of layers.

Figure 1:
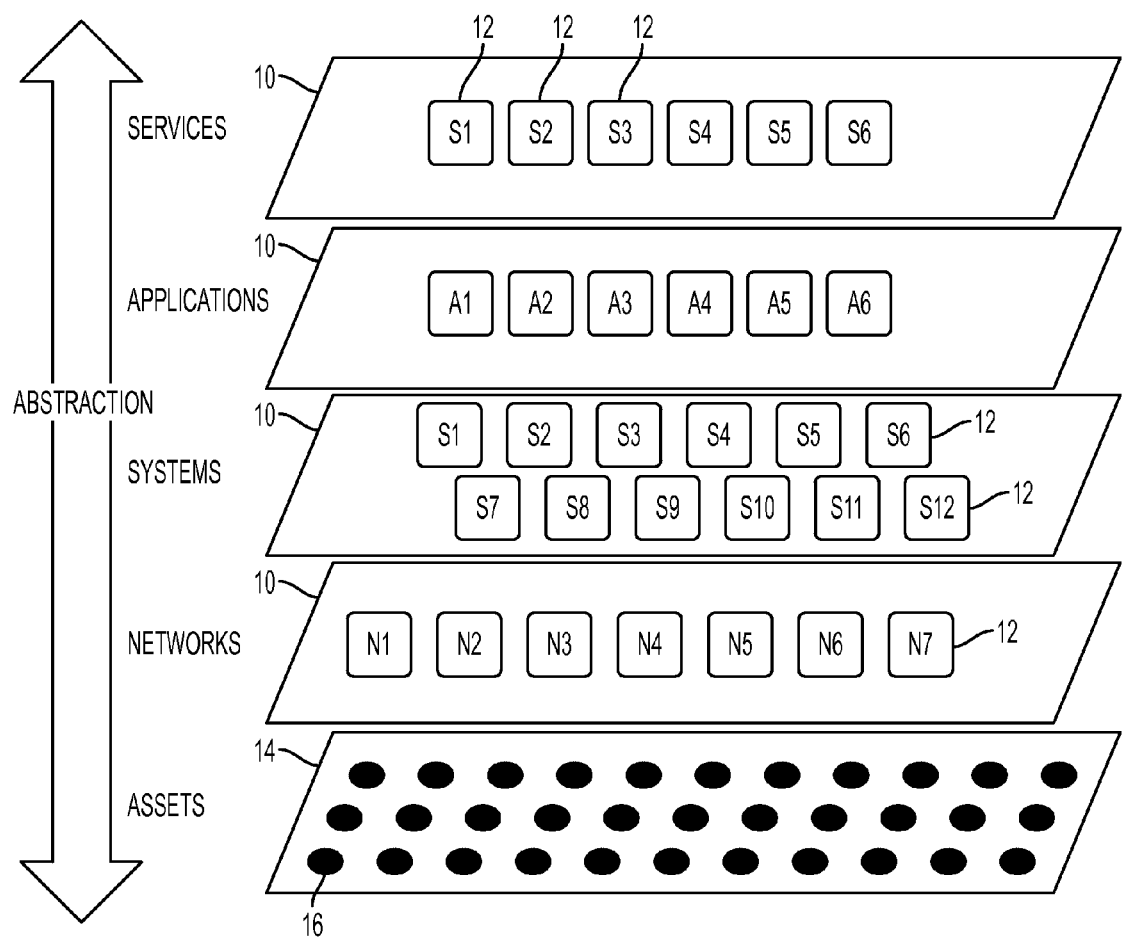
FIG. 1 is a schematic diagram of a stack of layers in accordance with the present invention.
Figure 3:
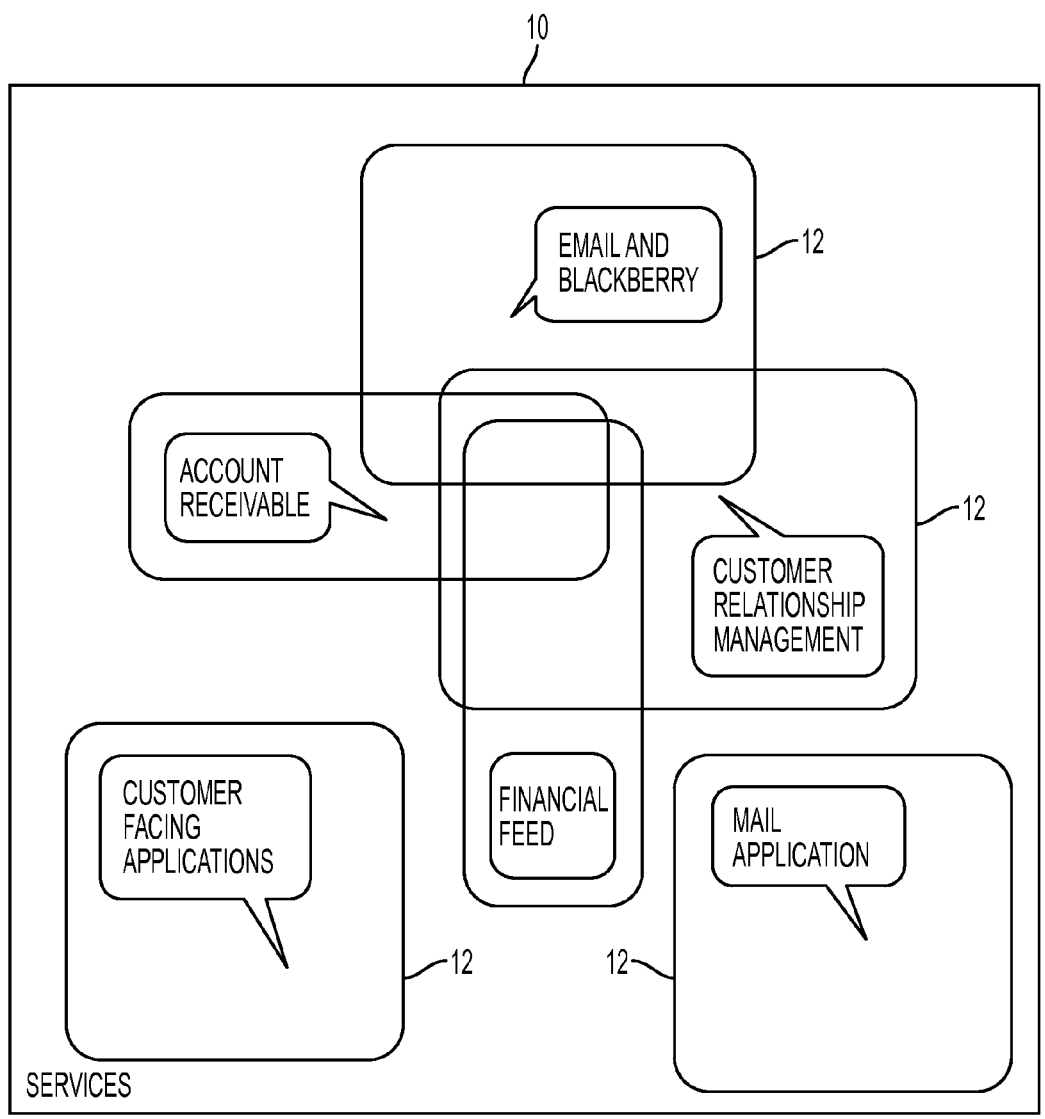
FIG. 3 is an exemplary layer with its overlapping elements.
Figure 4:
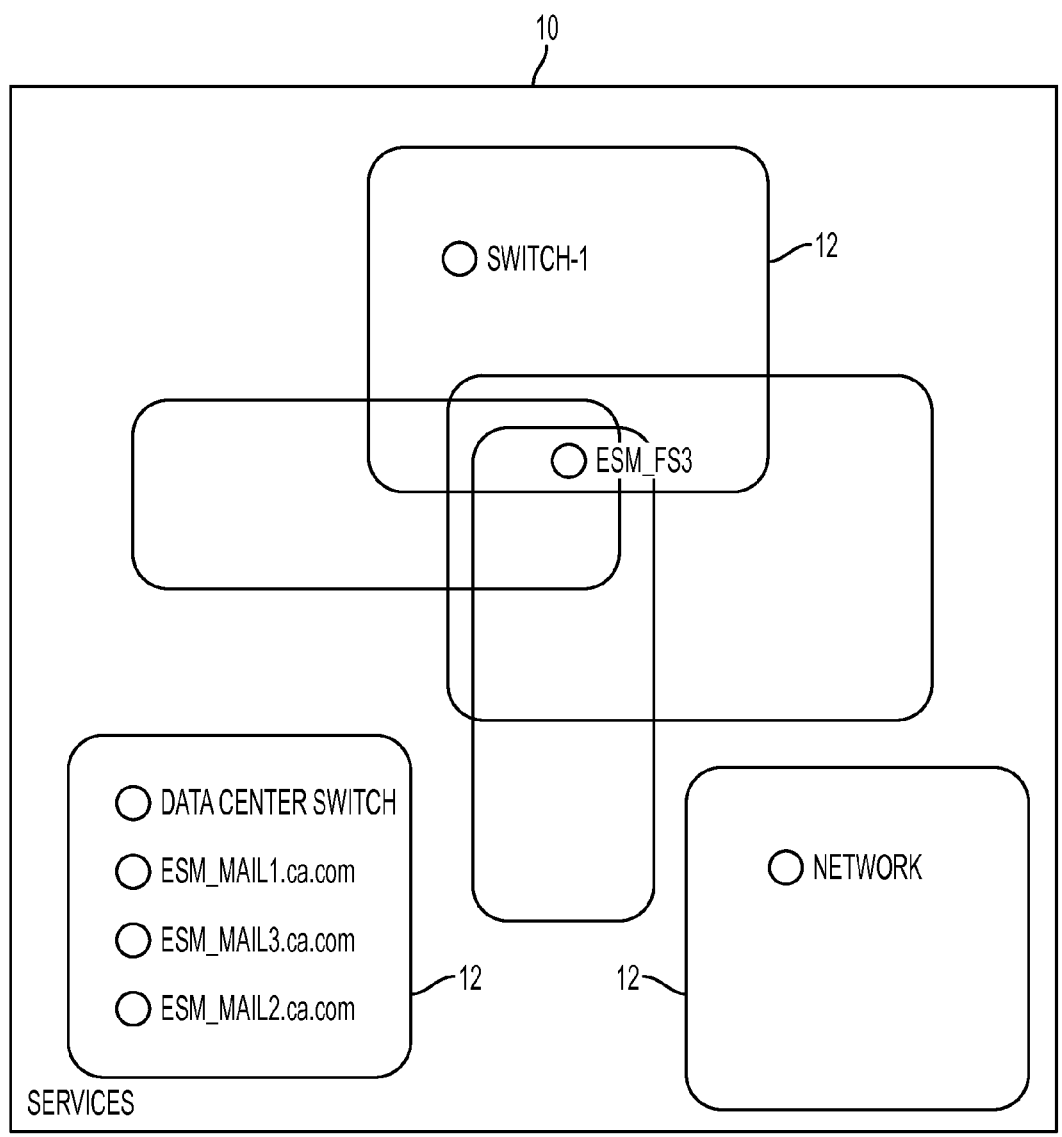
FIG. 4 is another exemplary layer with its overlapping elements.

FIG. 1 schematically illustrates a stack of layers 10 in an exemplary embodiment on a screen. Each individual layer, except the lowest layer, contains a region 12 or sub-set of the elements in the IT infrastructure. The layers are arranged in a hierarchical sequence according to their function and nature. The lowest layer 14 contains assets 16. Exemplary layers 10 with elements 18 are shown in FIGS. 3 and 4, which are described below. In the embodiment shown in FIG. 1, the layers are Services, Applications, Systems, Networks and Assets. Additional and/or other layers can be used.

Figure 2:
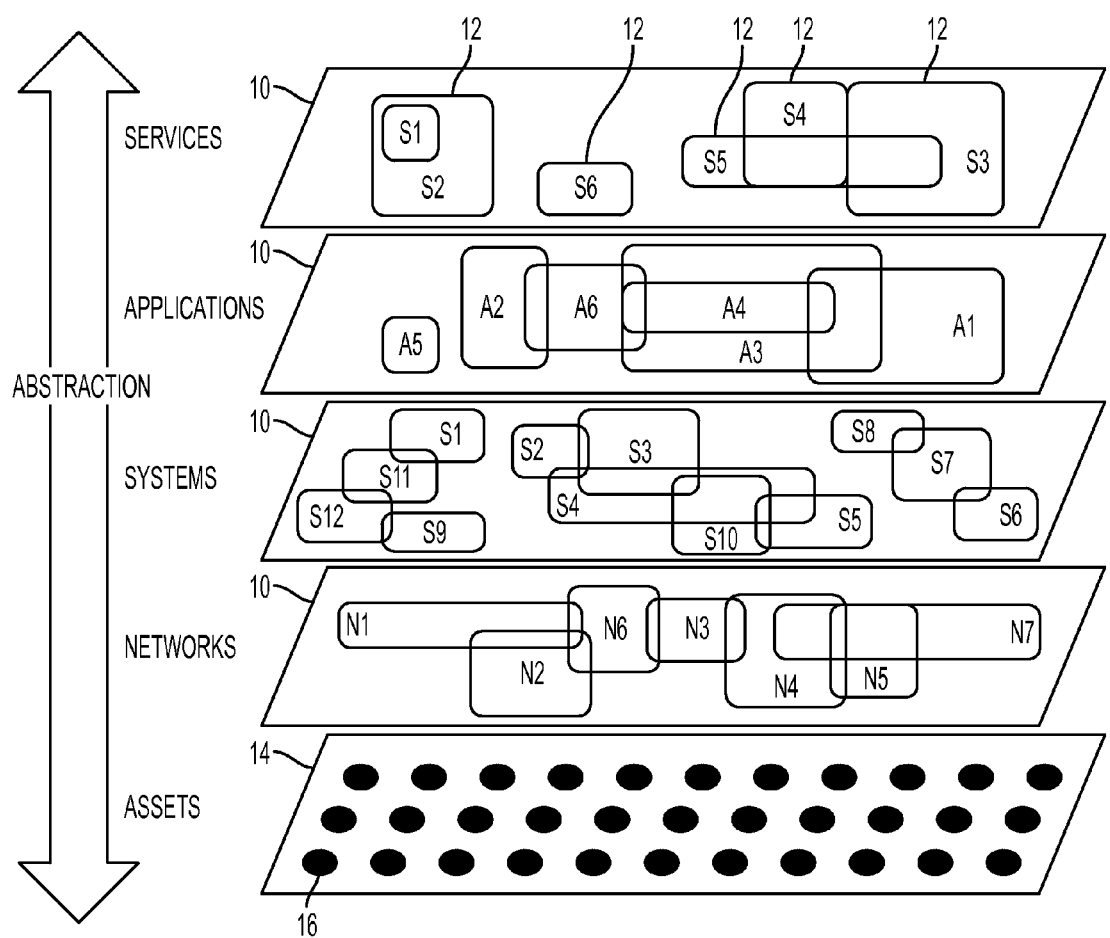
FIG. 2 shows an abstraction of a stack of layers, each having overlapping elements.

FIG. 2 shows an abstraction of a stack of layers 10 in layer view. In FIG. 2, each layer, except the lowest layer, contains collections of elements of IT infrastructure shown as overlapping regions 12. Areas of overlap among the regions identify common relationships to IT elements assigned to lower layers or levels of the layer hierarchy. This visual representation of overlapping sets of elements is called Euler diagrams.

The inventive method can calculate the overlap area among regions or groups of elements in a particular layer 10, such as the services in the service layer. Overlap can be calculated based on known relationships among elements. For example, if two services use the same network router, then the regions representing both services would overlap. These calculations can be performed using computer hardware, for example, a computer processor or CPU or other computing device known to one skilled in the art. For example, FIG. 2 shows service S1 12 within service S2 12, illustrating that all of the services in service S1 also exist in service S2. These services comprise elements from another layer, e.g., application, system, or network. As also exemplified in FIG. 2, the relationship among service S3 12, service S4 12 and service S5 12 can be determined by identifying common IT components or elements shared by service S4 12 and service S5 12, as well as service S3 12 and service S5 12, but not shared between service S3 and service S4.

The size of the overlap is not necessarily directly proportional to the number of elements shared. There are cases where the overlap area might need to be expanded to better fit the layout. The same applies to the size of each element and/or region in the layer.

FIG. 3 provides an example of regions 12, e.g., collections of all IT elements, of a corresponding layer, e.g., the service layer 10. As shown in FIG. 3, the service layer 10 contains groups of elements or regions 12 of Account Receivable, Email and Blackberry, Customer Relationship Management, Financial Feed, Customer Facing Applications and Mail Application. The regions Account Receivable, Email and Blackberry, Financial Feed and Customer Relationship Management share a common element of EMS-FS3; this is shown by the overlapping area among these regions.

FIG. 4 provides another example of regions in the Service layer. FIG. 4 shows one region containing an element called Network, another region containing elements Data center Switch, ESM_MAIL1.ca.com, ESM_MAIL3.ca.com, and ESM_MAIL2.ca.com. Four other regions overlap since all contain the element ESM_FS3 and one of the overlapping regions further contains element switch-1.

The novel display of the IT components in the layer view of the present invention not only clarifies the relationships but also enables a user to get more details about IT elements in the IT infrastructure. A user can select and un-select different regions of the layered view. For example, user might initially select Service 4 and Service 5 regions and then select Service 4 and un-select Service 5. This would indicate that user is interested in the elements of Service 4 that are not shared with Service 5. The inventive technique interprets these user choices or selections as formulas, such as Union, Intersection, etc. Selecting elements of Service 4 that are not shared with Service 5 can be interpreted as the formula Service 4-Service 5.

Figure 5:
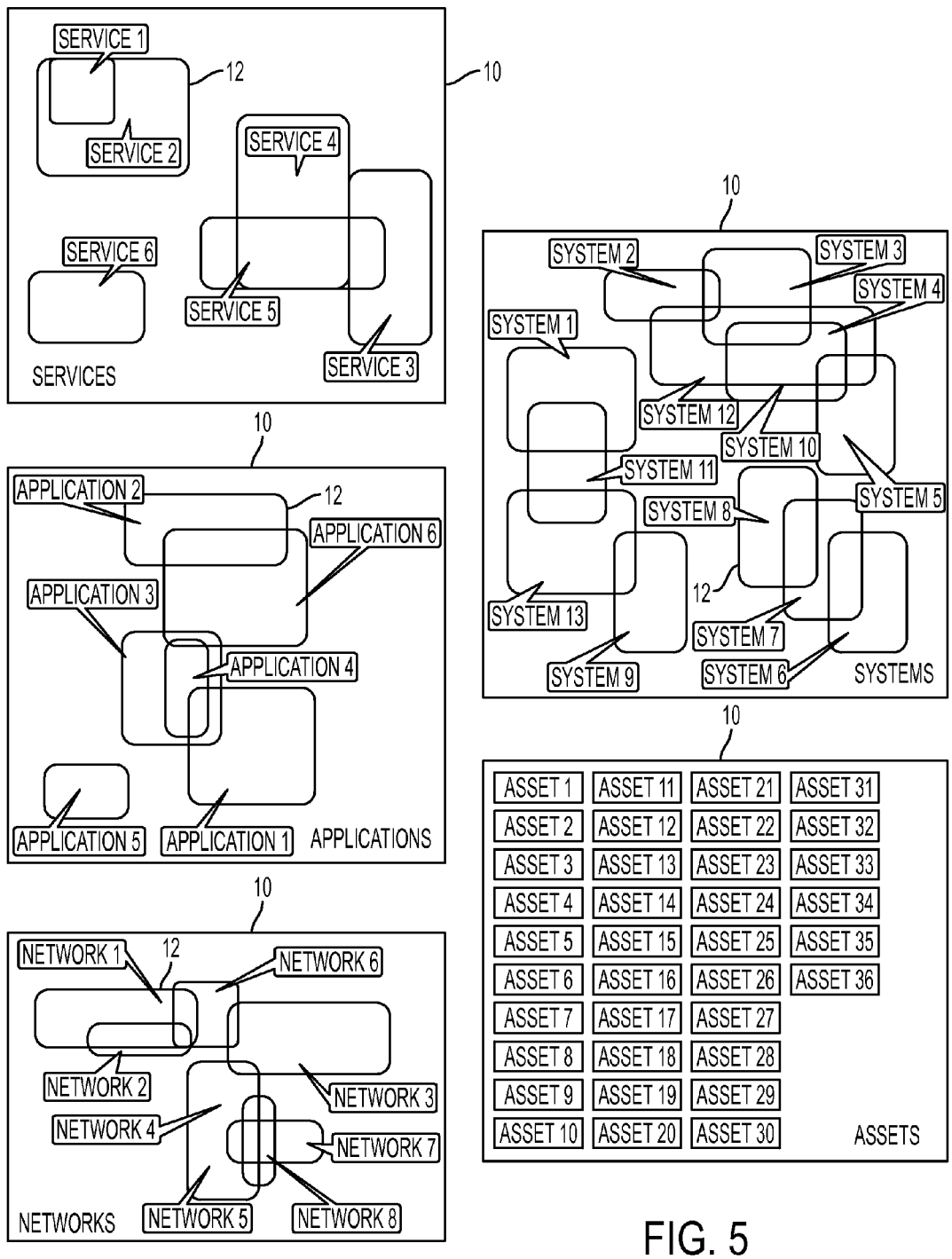
FIG. 5 is a layer view of a stack of layers with overlapping elements in each layer.

FIG. 5 shows elements and/or regions 12 and/or assets 16, in the environment mapped to different layers of Services, Applications, Systems, Networks and Assets in one embodiment of the invention. The elements in each layer can be grouped into regions; these elements and/or regions overlap with other appropriate elements.

Figure 6:
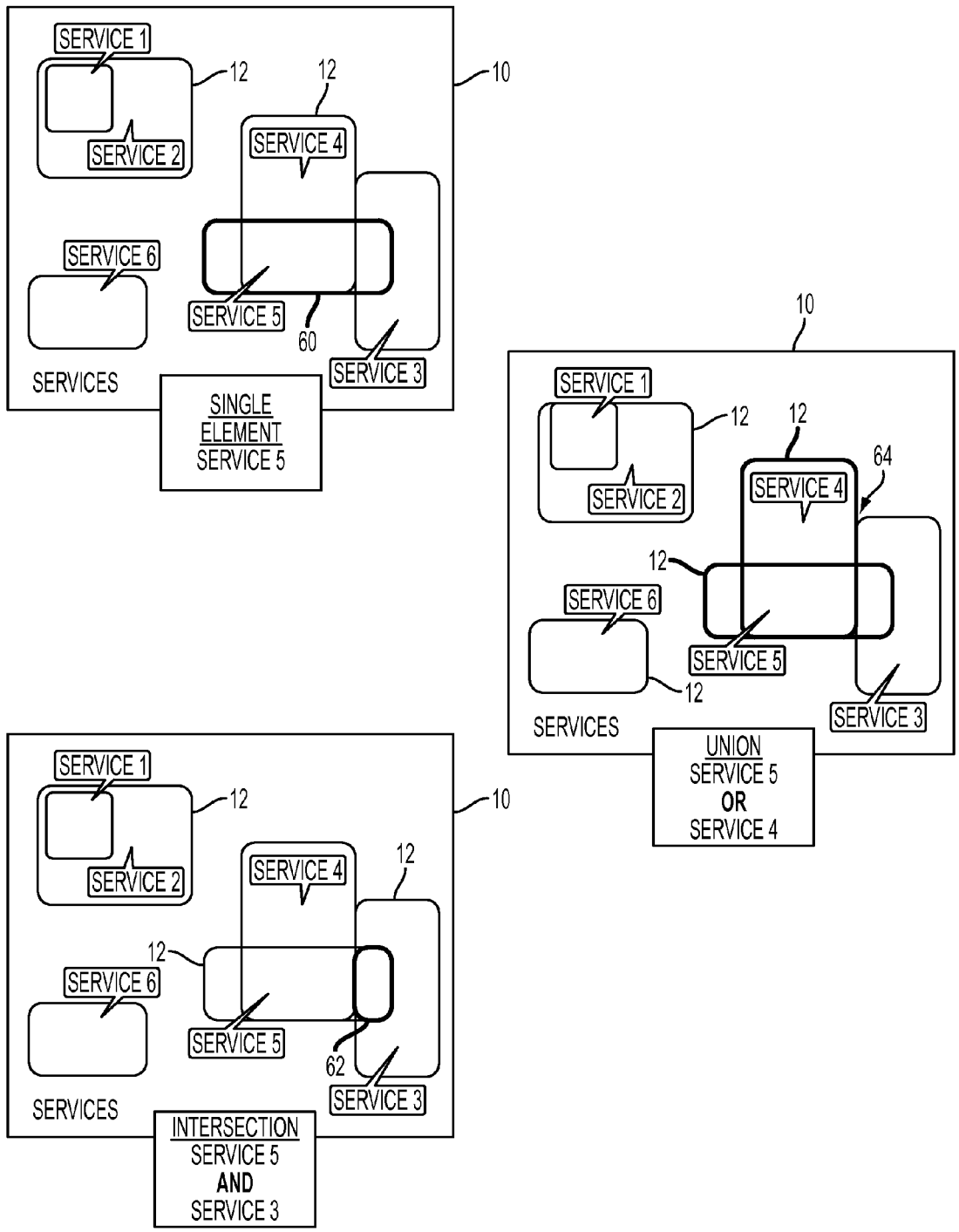
FIG. 6 shows a layer view of service dependencies.

FIG. 6 illustrates exploring service dependencies. On the upper left in FIG. 6, the region 60 of Service 5 is selected as shown by its thick border. This can be interpreted as "single element" of Service 5. In the lower left of FIG. 6, the region 62 that contains both Service 5 and Service 3 is selected, as shown by the thick border around both of these services 12.

This can be interpreted as the intersection of Service 5 and Service 3, e.g., Service 5 AND Service 3. On the right of FIG. 6, two regions 12 are selected, as shown by the two areas with thick borders. This can be interpreted as the union 64 of Service 5 with Service 4, e.g., Service 5 OR Service 4. This combination is achieved by selecting the area of overlap between Service 5 and Service 3, in which a user expresses interest in the elements of infrastructure that belong to both services.

Figure 7:
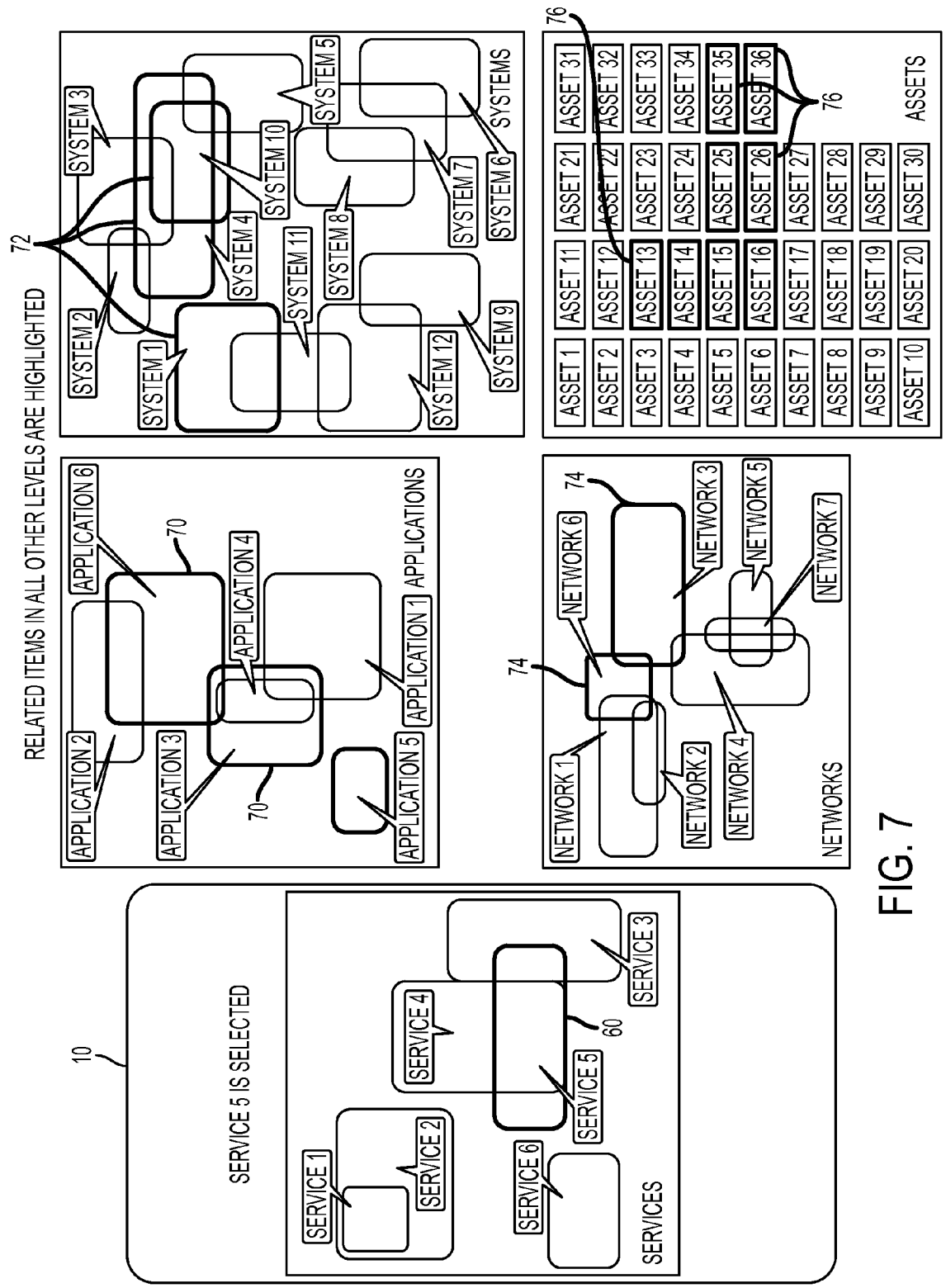
FIG. 7 shows a layer view of an element selected in one layer and related items in other layers.

FIG. 7 illustrates the layer view that can be displayed once the selection is made. FIG. 7 shows the case in which the region 60 of Service 5 is selected, as shown on the top left of FIG. 6. As shown in FIG. 7, the Services layer 10 appears on the left and the related items are highlighted (marked with thick borders) in all other layers (Applications, Systems, Networks, Assets). Only elements that belong to Service 5 will be emphasized or highlighted and presented to the user. FIG. 7 shows "Application 3", "Application 4" and "Application 6" 70 highlighted, to illustrate that these applications belong to Service 5. Similarly, "System 1", "System 4" and "System 10" 72 and "Network 3" and "Network 6" 74 and Asset13, Asset14, Asset15, Asset16, Asset25, Asset26, Asset35 and Asset36 78 are highlighted indicating that they belong to Service 5.

Figure 8:
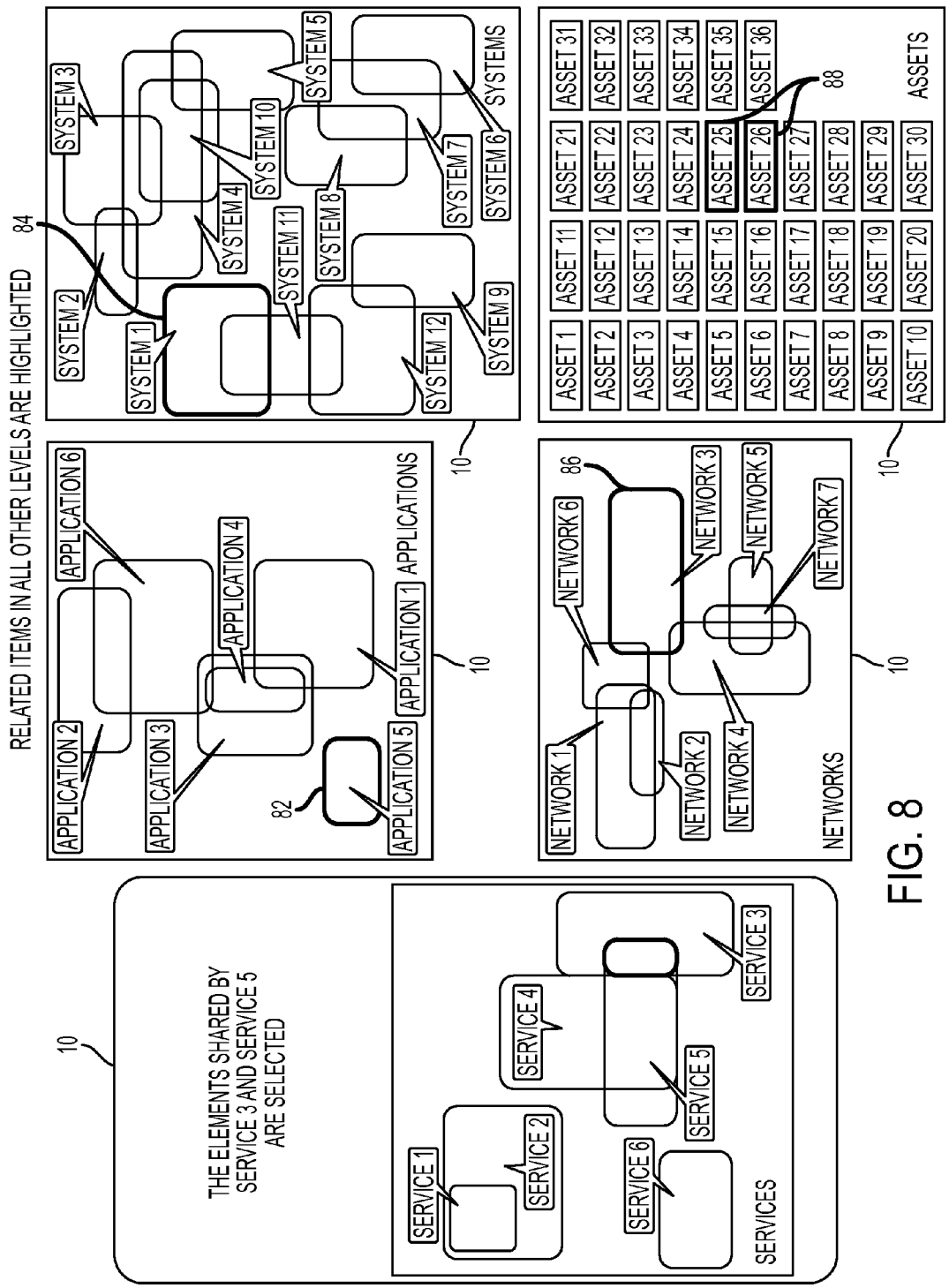
FIG. 8 shows a layer view of more than one element selected in one layer and related items in other layers.

FIG. 8 provides another example of the layer view that can be displayed once the selection is made. As shown on the left of FIG. 8, the user has selected the intersection of Service 3 and Service 5. Thus elements that occur in both of these services are highlighted in the layers shown on the right. These elements include "Application 5" 82, "System 1" 84, "Network 3" 86, and Asset25 and Asset26 88.

The same rule of visualization applies to all other layers of the stack. By selecting the intersection of services and switching to Application layer, the applications that belong to the intersected services will be automatically selected revealing applications common to those services; the user will see applications represented as areas and overlap among them would indicate shared application components, systems and networks.

Figure 9:
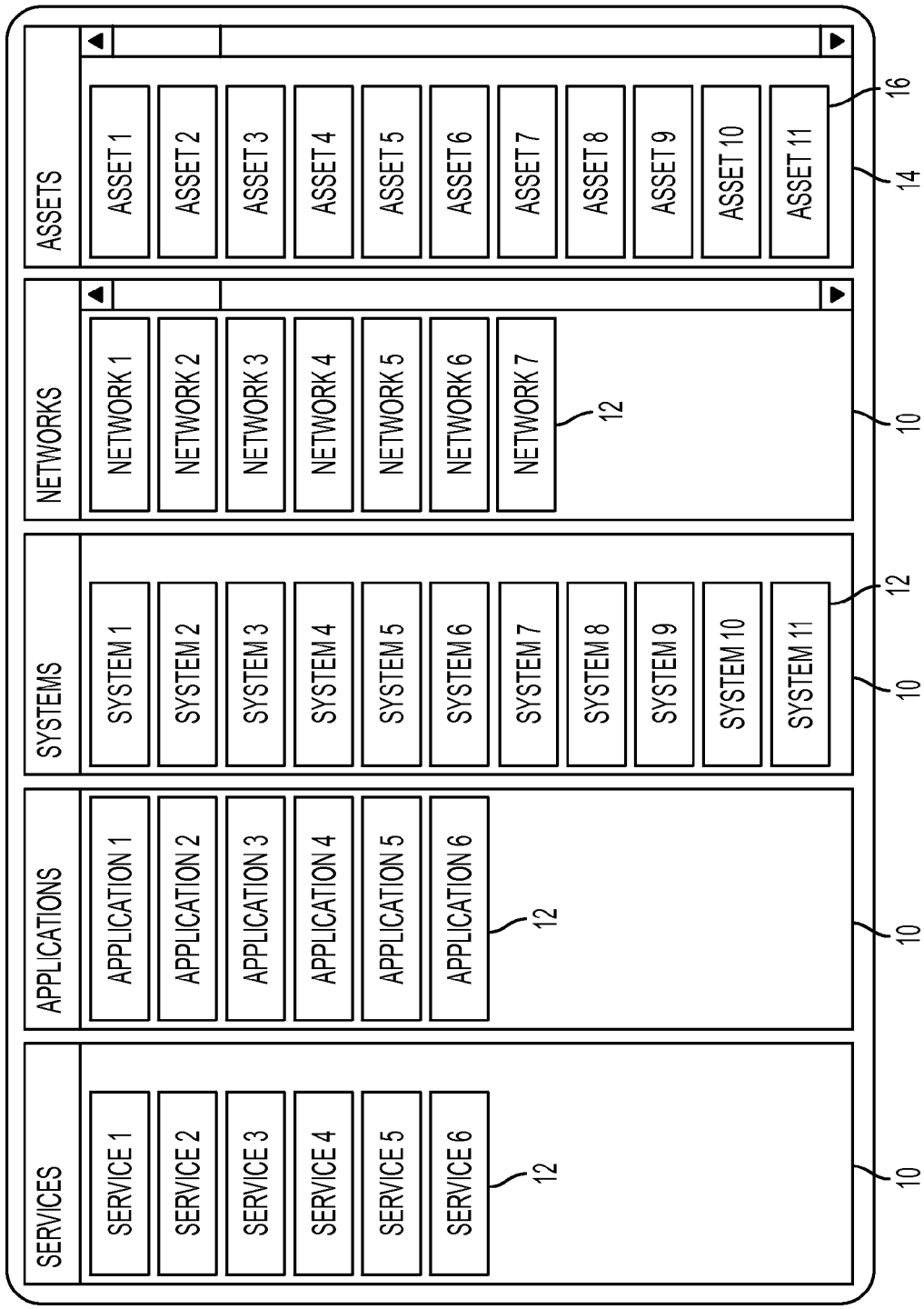
FIG. 9 is a band view of a stack of layers.

Band view is an at-a-glance overview of the entire layer stack. FIG. 9 shows a band view of the entire layer stack. Elements 12 and/or assets 16 in each layer are listed in a column. Simple filters, text-based search and sorting of elements can be applied to each layer. Band view can be used for refining selections. The selections can be carried over to the Layer view if desired.

Figure 10:
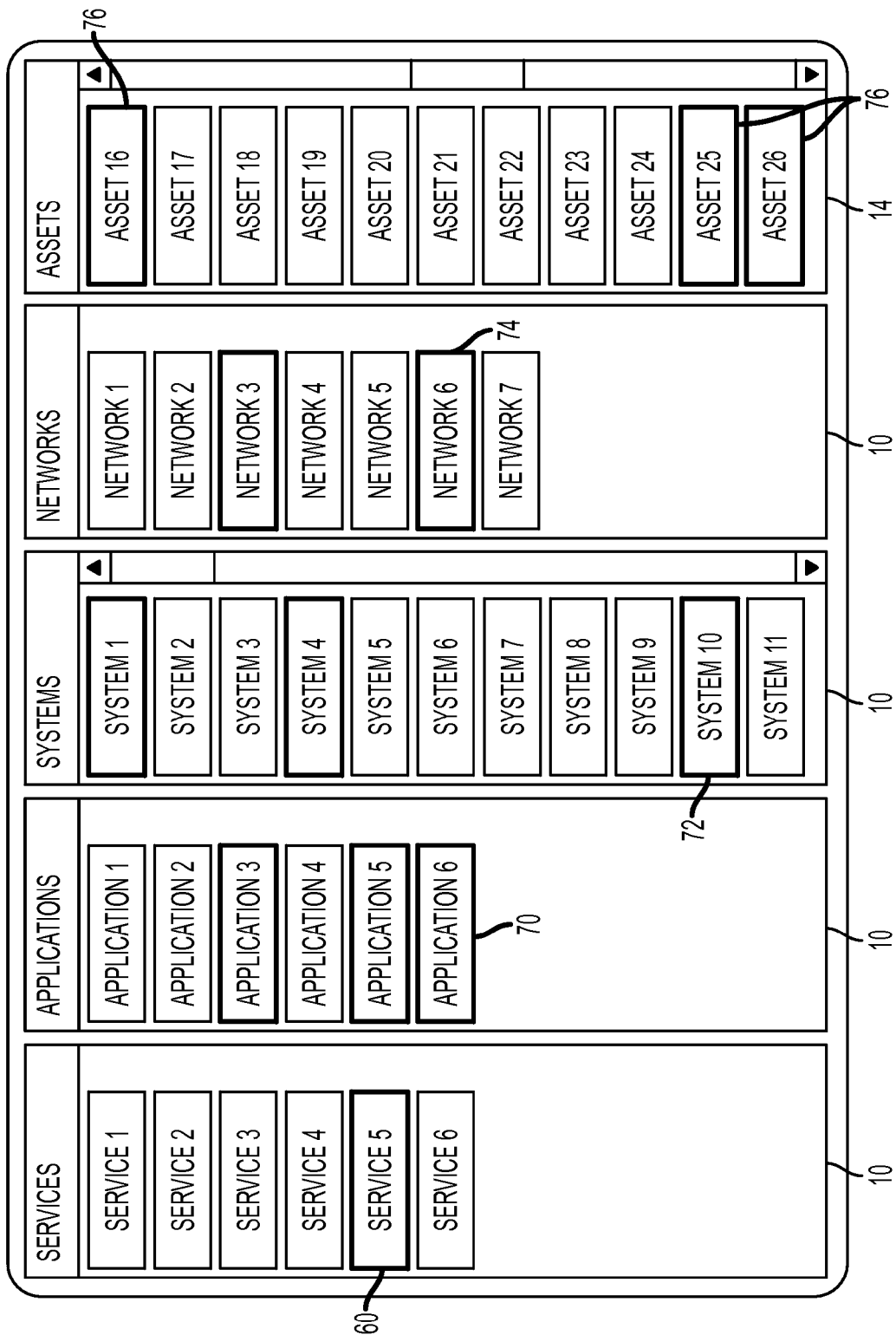
FIG. 10 shows a band view of an element selected in one layer and related items in other layers.

FIG. 10 illustrates layered stack of "Service 5" 60 using the band view. Elements related to Service 5 appear highlighted in lower layers; these are the same highlighted elements as in FIG. 7. A user can select/deselect elements in the view, as well as hide elements that are not highlighted. Every band can be presented as a list as shown in FIG. 10 or a graph of the corresponding layer.

Figure 11:
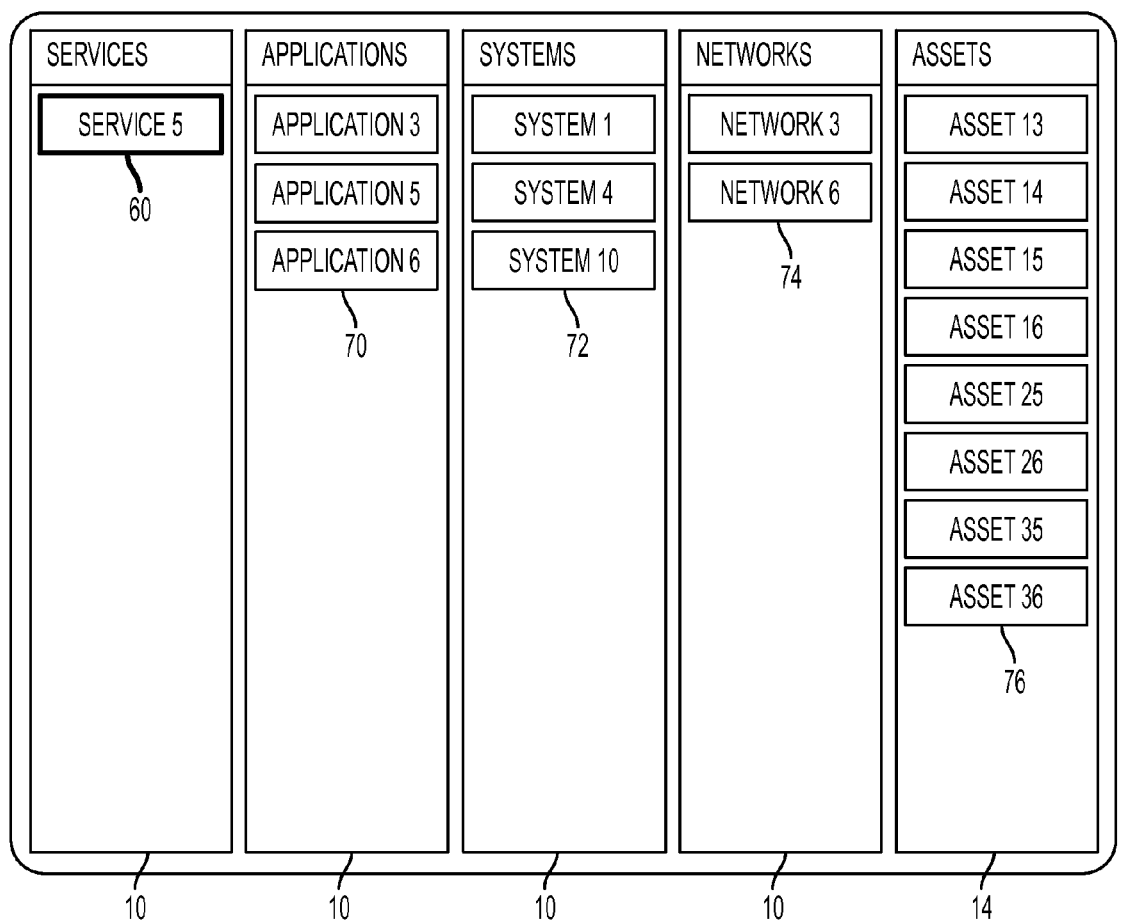
FIG. 11 shows a band view of an alternative display of an element selected in one layer and related items in other layers.

FIG. 11 illustrates an alternative presentation of Service 5. In FIG. 11, only the elements that occur in Service 5 are displayed; the other elements are hidden. These are the elements 60, 70, 72, 74, 76 that are highlighted in FIG. 10.

Figure 12:
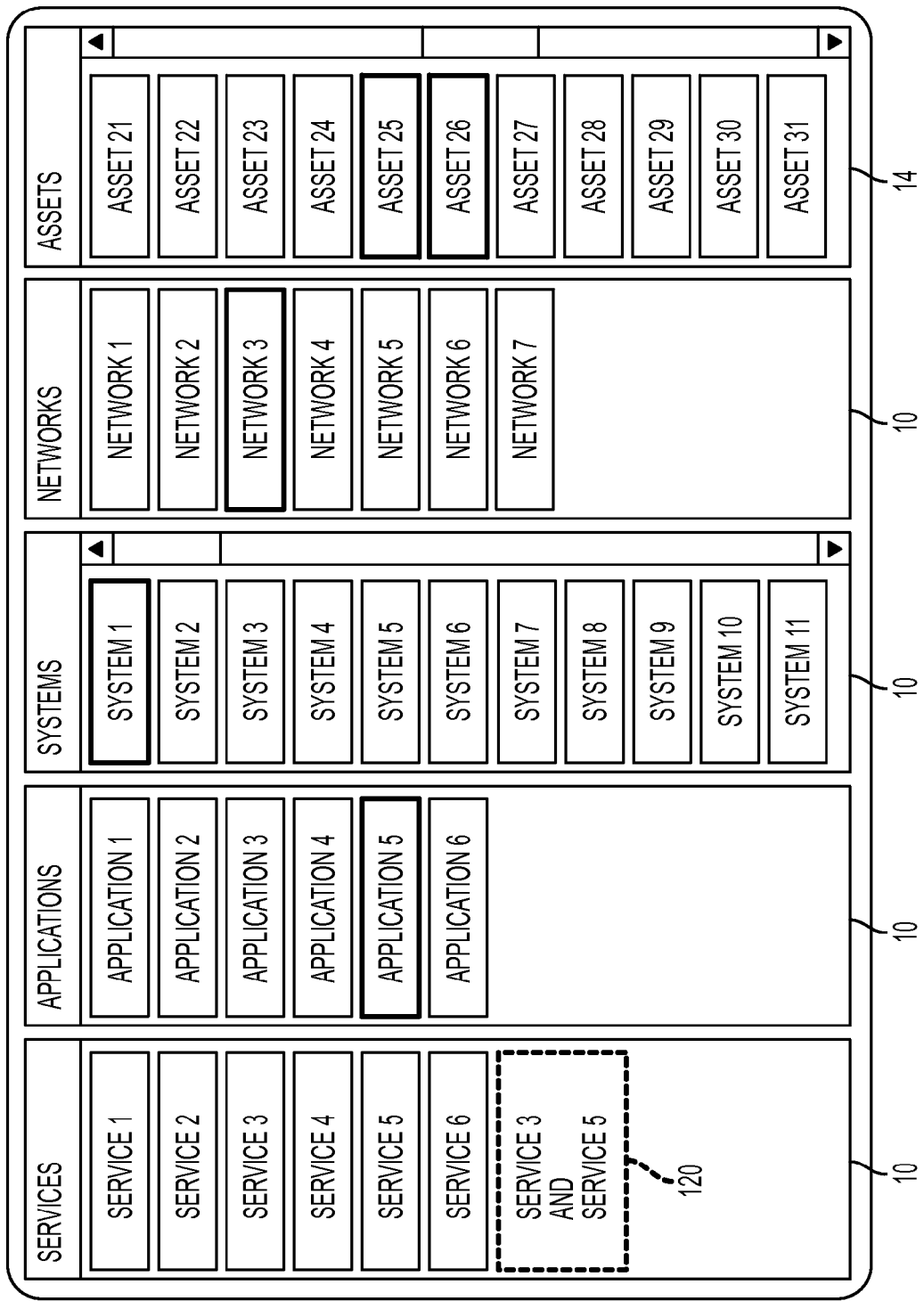
FIG. 12 shows a band view of more than one element selected in one layer and related items in other layers.

FIG. 12 illustrates adding a service to the service layer. FIG. 12 shows adding an element that reflects the intersection of "Service 3" and "Service 5" 120. The elements in the lower layers that occur in this intersection are highlighted in their appropriate columns. In particular, the intersection of "Service 3" and "Service 5" 120 includes Application 5, System 1, Network 3, Asset25 and Asset26.

Figure 13:
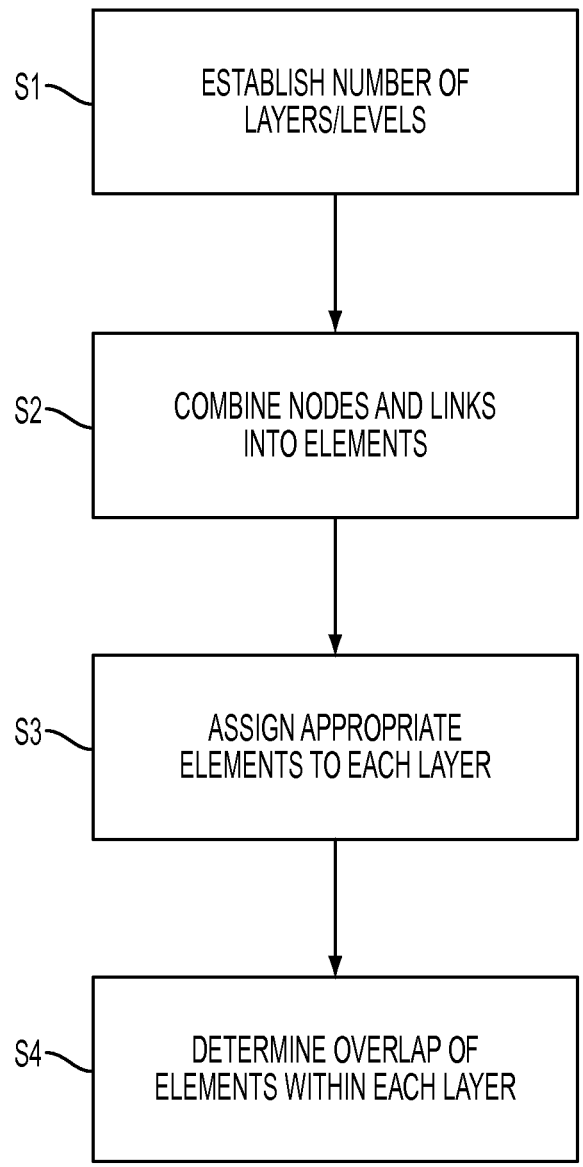
FIG. 13 is a flow diagram of the initialization phase of the inventive method.

FIG. 13 is a flow diagram of the initialization portion of the inventive method. During the initialization portion, the layers and their elements and regions are established. In step S1, the number of layers is established, for example by user input or from a predetermined value. In step S2, nodes and links of the IT environment, e.g., assets, are combined into elements based on function and/or type. In step S3, the elements are assigned to each layer. For example, assets or non-divisible elements are assigned to the lowest layer. Elements, created in step S2, assigned to one layer can be combined to form new elements or regions in another, higher layer. In step S4, overlap of the elements and/or regions is computed for all of the elements and/or regions in each layer. Computation of the overlap of elements and/or regions can be done using a general algorithm, as discussed above. Upon completion of step S4 for all layers, visualization and navigation can be performed on any and all layers.

Figure 14:
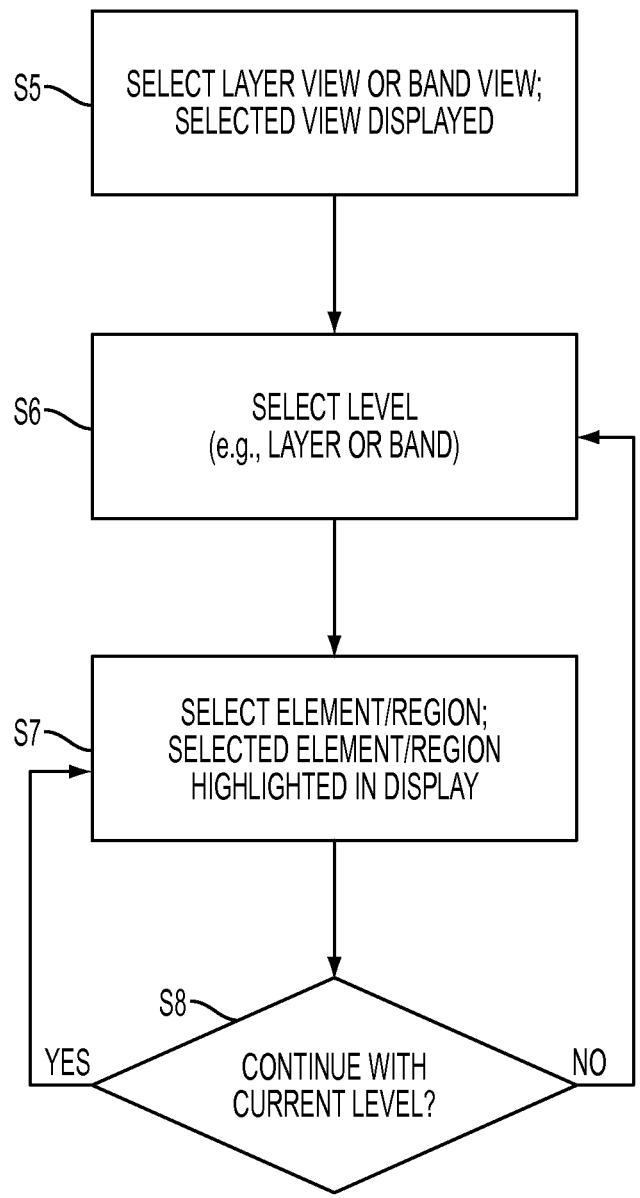
FIG. 14 is a flow diagram of navigation and visualization in the inventive method.

FIG. 14 is a flow diagram of navigation and visualization in the inventive method. In step S5, the user selects either the layer or the band view. In step S6, the user selects a level, e.g., layer or band, to explore. In step S7, the user selects a particular element or region in the chosen level and the system highlights the selection in the selected level and also highlights corresponding elements and/or regions in other levels. In step S8, it is determined whether the user wants to continue examining the currently selected level. If the user desires to continue in the chosen layer (S8=YES), processing continues at step S7.

Otherwise (S8=NO), processing continues at step S6 in which the user chooses a different layer or band to explore. After selecting another layer or band in step S6, processing resumes at step S7.

Selection of combinations of elements or regions in a particular level can be attained in step S7 when the user does not select a different layer or band. In step S7, a user can select, e.g., click on, a particular region, then click on another region to indicate that both regions are desired. In addition, the user can indicate that the intersection or union of two or more selected regions is desired. Based on the selection made, the inventive technique combines selected elements and/or regions in accordance with various functions. For example, regions A and B can be combined as A union B, A intersection B, A NOT B, etc. More than two regions can be combined. The process determines the combination based on the regions selected; the user does not have to specifically request the desired function (union, intersection, etc.).

Figure 15:
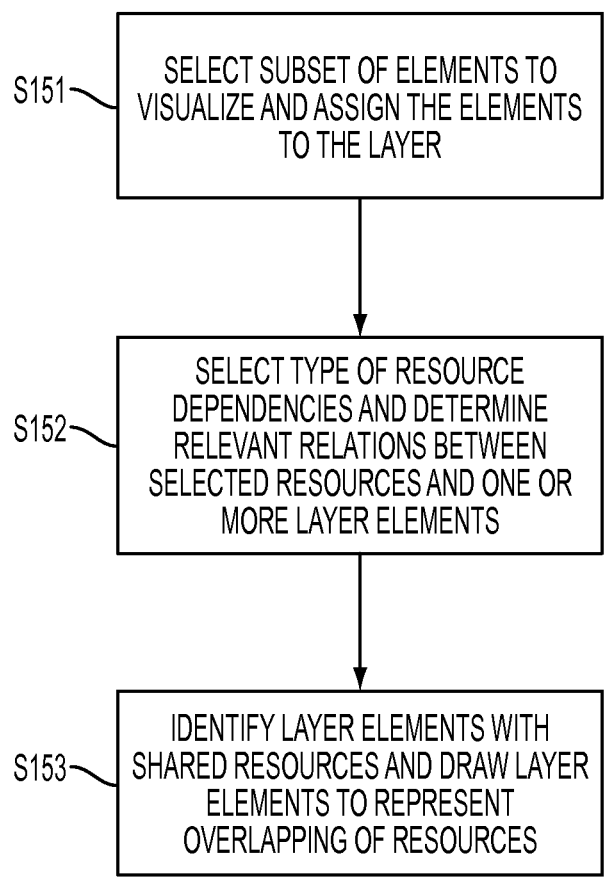
FIG. 15 is a flow diagram of a process for constructing a layer.

A layer can be defined in terms of the subset of elements to visualize on the layer and/or the resources that these elements share. An algorithm for defining a layer is described and shown as a flow diagram in FIG. 15. In step S151, a subset of elements to visualize is selected and these elements are assigned to the layer. In step S152, the type of resource dependencies to be visualized are selected and relevant relations between these selected resources and one or more layer elements are determined. In step S153, layer elements with shared resources are identified, and layer elements to represent overlapping of resources are drawn.

The inventive visualization technique enables semantically rich navigation. The selection mechanism in the Layer view allows informal expression of formal logical formulas used as filter expression for graph visualization. This allows for semantically rich visual expression constraints controlling content of graphs presented to the user. The Band view allows for refinement of selection and at-a-glance overview of multiple logically connected graphs. Both views together represent a semantically rich overview mechanism enabling navigation of very large infrastructures in an understandable way.

The inventive system and method advantageously simplifies the browsing experience. A natural way of thinking about IT infrastructure is presented. Beneficially the inventive system and method is domain neutral and includes the potential for cross-product navigation.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method, comprising:
   initializing, using a processor, a layered overview visualization of a computing environment having a plurality of elements, said elements comprising assets or groups of assets in the computing environment, said initializing comprising:
      defining a plurality of hierarchical levels including a first level and a second level below the first level;
      assigning a first element of the plurality of elements and a second element of the plurality of elements to the first level; and
   assigning a common element to the second level, wherein the common element is included within both the first element and the second element in the first level; and
      identifying an overlap between the first element and the second element of the first level as a result of the presence of the common element in the second level that is included in both the first element and the second element of the first level; and
   navigating the layered overview visualization, said navigating comprising:
      receiving a selection of a view of the computing environment;
      receiving a selection of the first level of the hierarchical levels within the selected view;
      receiving a selection of the overlap of the first element and the second element in the selected level and highlighting the overlapping elements; and
      displaying on a screen the selected level and the highlighted overlapping elements in the selected level.

2. The method according to claim 1, further comprising displaying one or more of the non-selected levels and elements related to the chosen highlighted elements in the one or more non-selected levels.

3. The method according to claim 1, wherein some of the elements are individual assets and are assigned a lowest level of the hierarchical levels.

4. The method according to claim 1, wherein identifying the overlap is performed using a function determined based on user input.

5. The method according to claim 1, wherein identifying the overlap is performed using a general algorithm.

6. A non-transitory computer readable storage medium storing a program of instructions executable by a computer to perform a method for layered overview visualization of an IT environment having nodes and links related to the nodes, comprising:
   initializing a layered overview visualization of a computing environment having a plurality of elements, said elements comprising assets or groups of assets in the computing environment, said initializing comprising:
      defining a plurality of hierarchical levels including a first level and a second level below the first level;
      assigning a first element of the plurality of elements and a second element of the plurality of elements to the first level; and
      assigning a common element to the second level, wherein the common element is included within both the first element and the second element in the first level; and
   identifying an overlap between the first element and the second element of the first level as a result of the presence of the common element in the second level that is included in both the first element and the second element of the first level; and
   navigating the layered overview visualization, said navigating comprising:
      receiving a selection of a view of the computing environment;

receiving a selection of the first level of the hierarchical levels within the selected view;

receiving a selection of the overlap of the first element and the second element in the selected level and highlighting the overlapping elements; and displaying on a screen the selected level and the highlighted overlapping elements in the selected level.

7. The computer readable storage medium according to claim 6, further comprising displaying one or more of the non-selected levels and elements related to the chosen highlighted elements in the one or more non-selected levels.

8. The computer readable storage medium according to claim 6, wherein some of the elements comprise individual assets and are assigned a lowest level of the hierarchical levels.

9. The computer readable storage medium according to claim 6, wherein identifying the overlap is performed using a function determined based on user input.

10. The computer readable storage medium according to claim 6, wherein identifying the overlap is performed using a general algorithm.

11. A system, comprising:

a processor; and a memory coupled to the processor, the memory comprising computer readable program code embodied therein that, when executed by the processor, causes the processor to perform operations comprising:

initializing, using a processor, a layered overview visualization of a computing environment having a plurality of elements, said elements comprising assets or groups of assets in the computing environment, said initializing comprising:

defining a plurality of hierarchical levels including a first level and a second level below the first level;

assigning a first element of the plurality of elements and a second element of the plurality of elements to the first level; and assigning a common element to the second level, wherein the common element is included within both the first element and the second element in the first level; and identifying an overlap between the first element and the second element of the first level as a result of the presence of the common element in the second level that is included in both the first element and the second element of the first level; and navigating the layered overview visualization, said navigating comprising:

receiving a selection of a view of the computing environment;

receiving a selection of the first level of the hierarchical levels within the selected view;

receiving a selection of the overlap of the first element and the second element in the selected level and highlighting the overlapping elements; and displaying on a screen the selected level and the highlighted overlapping elements in the selected level.

12. The system according to claim 11, wherein the computer readable program code further causes the processor to perform operations comprising displaying one or more of the non-selected levels and elements related to the chosen highlighted elements in the one or more non-selected levels.

13. The system according to claim 11, wherein some of the elements are individual assets and are assigned a lowest level of the hierarchical levels.

14. The system according to claim 11, wherein the computer readable program code further causes the processor to perform operations comprising identifying the overlap using a function determined based on user input.

15. The system according to claim 11, wherein the computer readable program code further causes the processor to perform operations comprising identifying the overlap using a general algorithm.

* * * * *